US011243979B1

(12) United States Patent
Mishra et al.

(10) Patent No.: US 11,243,979 B1
(45) Date of Patent: Feb. 8, 2022

(54) ASYNCHRONOUS PROPAGATION OF DATABASE EVENTS

(71) Applicant: Amazon Technologies, Inc., Seattle, WA (US)

(72) Inventors: Arpan Kumar Mishra, Cuttack (IN); Dontula Kapil, Hyderabad (IN); Navneet Verma, Haryana (IN)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 16/696,777

(22) Filed: Nov. 26, 2019

(51) Int. Cl.
*G06F 16/27* (2019.01)
*G06F 16/23* (2019.01)

(52) U.S. Cl.
CPC ........ *G06F 16/273* (2019.01); *G06F 16/2358* (2019.01); *G06F 16/2365* (2019.01)

(58) Field of Classification Search
CPC . G06F 16/273; G06F 16/2358; G06F 16/2365
USPC ....................................................... 707/613
See application file for complete search history.

(56) References Cited

U.S. PATENT DOCUMENTS

| | | | | |
|---|---|---|---|---|
| 9,178,960 | B2* | 11/2015 | Abdelhadi | ............ H04L 69/40 |
| 2013/0151570 | A1* | 6/2013 | Sandoval | ............... G06Q 30/02 |
| | | | | 707/803 |
| 2014/0040920 | A1* | 2/2014 | Wu | ......................... G06F 9/542 |
| | | | | 719/318 |
| 2015/0193868 | A1* | 7/2015 | Del Vecchio | ........... H04L 67/10 |
| | | | | 705/35 |
| 2017/0177442 | A1* | 6/2017 | Han | .................... G06F 11/1471 |
| 2017/0316035 | A1* | 11/2017 | Karadashkov | .......... G06F 9/542 |
| 2019/0238605 | A1* | 8/2019 | Patel | ................. G06F 16/24568 |
| 2020/0184278 | A1* | 6/2020 | Zadeh | ................... G06F 16/953 |
| 2021/0081559 | A1* | 3/2021 | Gratton | ................... H04W 4/90 |

* cited by examiner

*Primary Examiner* — James Trujillo
*Assistant Examiner* — Fariborz Khoshnoodi
(74) *Attorney, Agent, or Firm* — Knobbe, Martens, Olson & Bear, LLP

(57) ABSTRACT

Systems and methods are provided for managing database updates in an environment in which data parity is to be maintained between multiple databases. Notifications regarding database events, such as data update operations that occur in a particular database, may be generated so that other databases and systems can perform corresponding data update operations. The notifications may be generated, consumed, and acted upon asynchronously with respect to each other. Such asynchronous propagation of database events provides improved performance and increased reliability over synchronous propagation.

20 Claims, 6 Drawing Sheets

ASYNCHRONOUS PROPAGATION OF DATABASE EVENTS

BACKGROUND

Computing devices can utilize communication networks to exchange data. Companies and organizations operate computer networks that interconnect a number of computing devices to support operations or to provide services to third parties. Data centers may include a number of interconnected computing systems to provide computing resources to internal and/or external users. In a common implementation, a data center provides data storage services configured to store data submitted by client devices, and enable retrieval of that data over a network. For example, users may interact with network resources, such as web pages, mobile applications, and the like to create, read, update, and/or delete data stored by the data storage services.

DETAILED DESCRIPTION

Figure 1:
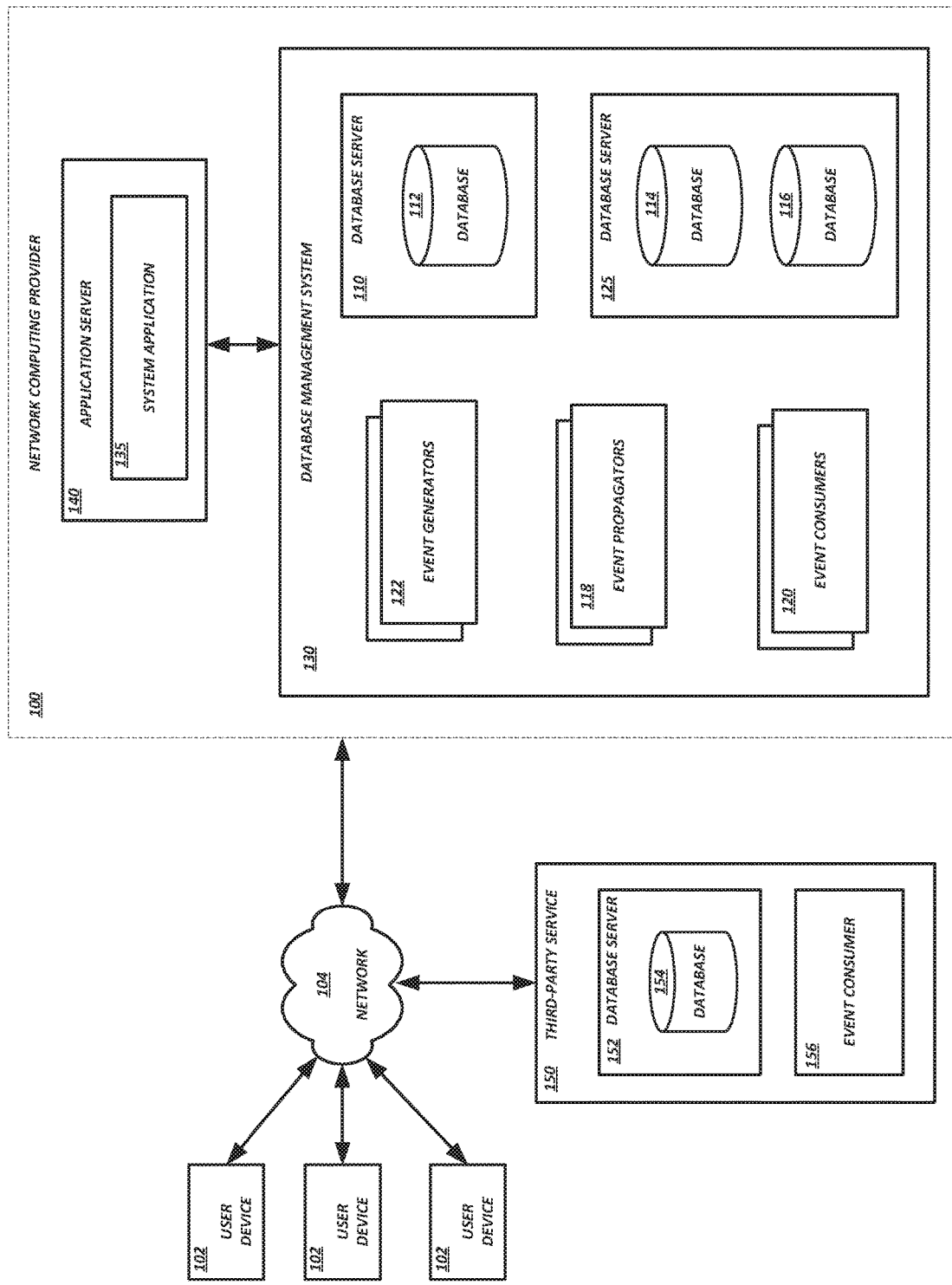
FIG. 1 illustrates an embodiment of a database management system used to manage propagation of asynchronous data updates among multiple databases.

The present disclosure is directed to systems and methods for managing database updates in an environment in which data parity is to be maintained between multiple databases. Notifications regarding database events, such as data update operations that occur in a particular database, may be generated so that other databases and systems can perform corresponding data update operations. The notifications may be generated, consumed, and acted upon asynchronously with respect to each other. Such asynchronous propagation of database events provides improved performance and increased reliability in comparison with synchronous propagation.

Some existing systems use a synchronous data update propagation mechanism where the system in which a data update is originally executed and the system that is to be updated in a corresponding manner will apply the data updates according to a sequence, one at a time. Performing data updates synchronously has many disadvantages. For example, to receive a notification that an update is successful or otherwise continue operation of a system, a user may have to wait for updates to both databases to be complete. The inherent wait time during synchronous data updates can result in unnecessarily high latency for the transaction. Additionally, when a failure to update a second database occurs in a synchronous data propagation implementation, the database system in which the data update was originally executed must roll back the successful update operation so that the various data stores remain in parity. For these and other reasons, failure events in a synchronous data propagation negatively and unnecessarily impact the user experience.

Some aspects of the present disclosure address the issues noted above, among others, by providing asynchronous propagation of data update operations between multiple databases. A request to update a source database is received from an application server, or other front-end process configured to provide content to be presented in a user interface (UI). Once a successful data update of the source database is determined, the UI may reflect the successful data update even though the data update has not yet been propagated to other databases. An event propagator may be notified of the data update event, and generate an event notification regarding the event. Using a publisher and subscriber mechanism, summary or generic event notifications are published onto a queue for every data update request (or some subset thereof) made through the application server or UI.

An event notification triggers an event consumer to begin a second database update routine for a target database, corresponding to the update routine initially completed in the source database. For example, an event consumer may receive a generic event notification (e.g., a notification that does not include the updated data, but rather includes an identifier of the updated data or otherwise indicates which data in the source database has been changed). The event consumer may obtain the updated data from the source database. In this way, the event consumers can be sure that they have the most up-to-date data for making corresponding updates to other databases, thereby avoiding a situation where they may use out-of-date data that was included in a detailed notification. Similar update routines can be performed by any number of other event consumers, in any number of other target databases, depending upon which event consumers subscribe to the particular type of event notification that was generated. By employing such an asynchronous propagation routine, user interface latency is reduced and the user experience in a multi-database environment is improved as there is no longer a need for the systems to be updated in a sequential fashion.

Additional aspects of the present disclosure relate to effectively dealing with failures that occur during the asynchronous propagation of data updates to other databases. Failures may be categorized based on their causes or other characteristics, and different retry procedures may be used for different categories of errors. In some embodiments, failures may be categorized as being either transient or permanent. A transient failure may result from a circumstance that is likely temporary and may resolve automatically without specific intervention. For example, a transient error may be caused by network congestion. In such circumstances, the data update may be automatically retried at predetermined or dynamically-determined intervals until the data update is successfully completed. In contrast, a permanent failure may be caused by a condition that requires specific intervention before it is resolved. For example, the failure may be caused by a program code error. In such scenarios, if the data update is retried the failure will continue to occur until the code is fixed. For this category of error, the update operation may be delayed until the condition is resolved—or the update may be terminated—to avoid scenarios where the data update is automatically retried continuously, potentially slowing downstream systems.

Thus, the categorized and differentiated handling of update failures is more efficient and effective than automatically retrying failures whose causes will not be resolved without intervention, or rolling back a successful update to one database based on an error in updating a different database that may be merely transient in nature.

For illustrative purposes and without limitation, the technologies disclosed herein may be utilized with a temporal database management system that manages real-time or otherwise time-dependent data records. In this illustrative embodiment, a first database containing information used to power the database management system UI is used along with a second database in which time-dependent information is also to be stored (e.g., for use by other systems). Temporal information may include information about the availability of a good or service that is time-dependent, such as a good or service that is available according to a schedule. For example, in a traditional product inventory system, a vendor selling 100 units of televisions keeps the television inventory in a warehouse until the inventory is either exhausted or recalled by the manufacturer. However, in a temporal inventory environment where 100 technicians are available to perform installations and individual technicians have scheduled availability that may change from day-to-day, the inventory managed by the inventory system is variable and highly time-dependent.

Although aspects of some embodiments described in the disclosure will focus, for the purpose of illustration, on particular examples of a database management system, or an asynchronous record update, the examples are illustrative only and are not intended to be limiting. The technologies disclosed herein may also be utilized with other types of systems. In this regard, it should be appreciated that the configurations disclosed herein are not limited to the cited illustrations and may be utilized to optimize the process of data propagation in other technical environments. Various aspects of the disclosure will now be described with regard to certain examples and embodiments, which are intended to illustrate but not limit the disclosure.

Multi-Database Environment

FIG. 1 is a block diagram showing a network computing provider 100, including a database management system 130 for maintaining data parity between multiple databases by providing asynchronous database updates. The database management system 130 includes a set of database servers 110 and 125, one or more event generation systems 122, one or more event propagation systems 118, and one or more event consumption systems 120 that may be used to implement aspects of the present disclosure. For convenience, event generation systems 122 may also be referred to as event generators 122, event propagation systems 118 may also be referred to as event propagators 118, and event consumption systems 120 may also be referred to as event consumers 120.

One or more of the databases 112, 114, 116 stored in the database servers 110 and 125 may be accessed from outside the network computing provider 100 via various devices, such as via an application server 140. An application server 140 can be interconnected with a database server 110 or 125 directly (e.g., implemented on a same computing device) or may communicate with a database server via a network.

Databases in a multi-database environment may all be located together within the database management system 130, or some may be located outside of the database management system 130. In some embodiments, one or more databases may be located outside of the network computing provider 100 such that they are physically apart from the network computing provider 100 and communicate with components of the network computing provider 100 via an external network, such as communication network 104. For example, databases may be at a client location or they may be at an alternate site of a third-party service 150.

The components of the network computing provider 100 may be implemented on one or more physical server computing devices. In some embodiments, the application server 140 and/or database management system 130 (or individual components thereof, such as the event generators 122, event propagators 118, event consumers 120, and/or the database servers 110, 125) may be implemented on one or more host devices, such as blade servers, midrange computing devices, mainframe computers, or any other computing device configured to provide computing services and resources. For example, a single host device may execute or otherwise host one or more event generators 122, event propagators 118, event consumers 120, database servers 110 and 125, some combination thereof, etc. The database management system 130 may include any number of such hosts. In some embodiments, a database management system 130 may include fewer, additional, and/or alterative components. In some embodiments, a network computing provider 100 may include multiple database management systems 130, application servers 140, and the like.

In some embodiments, the features and services provided by the network computing provider 100 may be implemented as web services consumable via one or more communication networks. In further embodiments, the application server 140, database management system 130, and/or individual components thereof are provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

User computing devices 102—also referred to simply as "user devices" for convenience—may be any computing device configured to interact with and submit data modifications to the network computing provider 100. For example, a user device 102 may be may include a desktop computing device, a laptop computing device, a tablet computing device, a mobile media player, an electronic reader, a mobile phone configured with network access and program execution capabilities (e.g., a "smart phone"), a wearable computing device configured with network access and program execution capabilities (e.g., a "smart watch" or "smart eyewear"), a television configured with network access and program execution capabilities (e.g., a "smart TV"), a video game console, a set top box, a server computing device, or any other computing device or appliance.

User devices may communicate with the network computing provider 100 via a communication network 104. The communication network 104 (also referred to simply as a "network") may be a publicly-accessible network of linked networks, possibly operated by various distinct parties, such as the Internet. In some cases, the network 104 may be or include a private network, personal area network, local area network, wide area network, global area network, cable network, satellite network, cellular data network, etc., or a combination thereof, some or all of which may or may not have access to and/or from the Internet.

In some embodiments, individual users can perform data-modification transactions via an application server 140 directly on the databases through the database servers 110 or 125, e.g., using a query language. Alternatively, a system application 135 operating on an application server 140 or in conjunction with a database server 110, 125 can provide a user-friendly front end or interface over which data can be entered, interpreted, and retrieved.

The databases 112, 114, 116, 154 may be logically composed of data tables, data objects, and other data storage constructs or components (not shown). A query engine within the database servers 110, 125, 152 can provide the basic functionality for creating data to be stored within the databases 112, 114, 116, 154 interrogating the databases, updating data items stored in the data tables therein, and/or deleting data from the databases (the "CRUD" database operations). For example, the query engine (not shown) in coordination with other components, provides users with the capability to update time-dependent or "temporal" data values stored in the databases.

In some embodiments, the event generators 122 are configured to track or otherwise be informed of data events, such as data updates in the databases 112, 114, 116. The event generators 122 inform event propagators 118 of the events. For example, event generators 122 may send notifications to event propagators 118 indicating the occurrence of a data event, send data summarizing or detailing a data event, etc.

Based on the detected events, the event propagators 118 may generate event notifications that are published to event consumers 120. For example, event notifications may be placed onto a queue that is polled or otherwise monitored by separate queues associated with individual event consumers 120, or from which event notifications are otherwise provided to event consumers 120. The publishing mechanism allows event consumers 120 to subscribe to receiving notifications regarding particular data events. The event notifications may include data regarding the event, such as event identifiers, data identifiers that indicate the data changes, time data regarding the time the data was changed, other data, or some combination thereof. As a database event occurs, an event notification is created and published (e.g., made available to event consumers 120, stored in an event queue, etc.). In some embodiments, there may be multiple event queues or other notification channels corresponding to multiple different types of events. Each type of database event may be mapped onto a queue such that notifications of the database events are placed in corresponding queues. For example, database events associated with certain types of data updates (e.g., certain database entities being updated) may be handled as different types of database events with different event notification queues.

An event consumer 120 can receive event notifications of certain database event types by subscribing to the corresponding event types and implementing event queues to poll for or otherwise monitor event notifications regarding the subscribed event types. An event consumption generally refers to reading captured event information and initiating some chain of activities based upon the captured events. For example, an event consumer 120 may be configured to extract information from one database 112 and add or update corresponding information in another database 114 to ensure that the two databases 112 and 114 remain in parity. Examples of event propagation through the publication of event notifications, and event consumption by initiating updates of additional databases based on published notifications, are described in greater detail below.

A third party service 150 may include one or more database servers 152 and event consumers 156. The event consumer 156 may be the same as or similar to an event consumer 120 within the network computing provider 100. For example, an event consumer 156 may be configured to subscribe to and obtain event notifications from event propagators 118 within the network computing provider 100, obtain data from a database within the network computing provider 100 (e.g., database 112), and store data in a database external to the network computing provider 100 (e.g., database 154) based on the subscribed event notifications.

Asynchronous Propagation of Data Modifications

Figure 2:
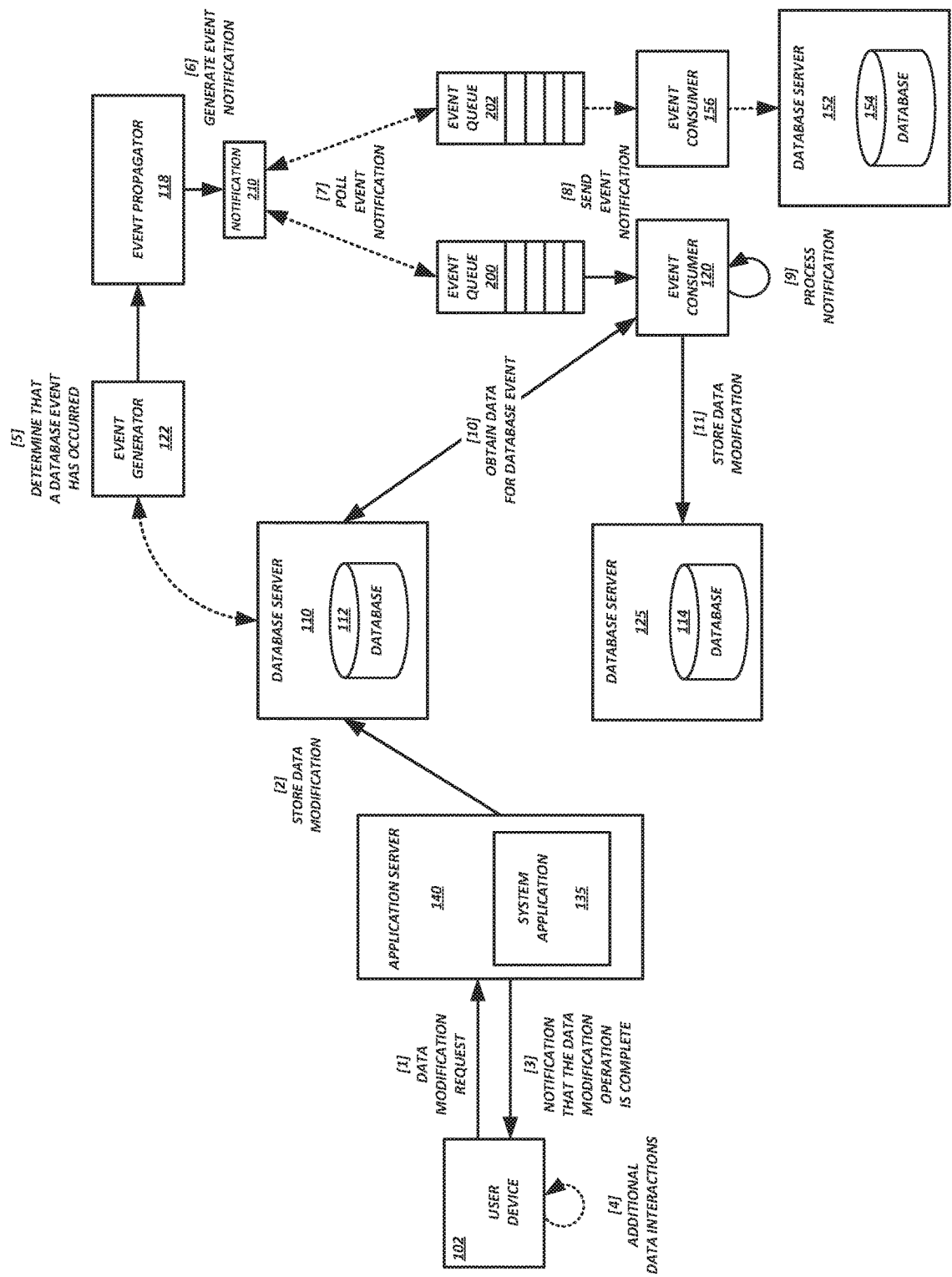
FIG. 2 is a block diagram of illustrative data flows and interactions during an asynchronous data update within a database management system according to some embodiments.

FIG. 2 is a block diagram of illustrative data flows and interactions that occur between components of a network computing provider 100 to asynchronously propagate database events according to some embodiments.

In some embodiments, as shown, a user device 102 requests a data modification at [1] via the application server 140 or some other interface. The data modification may involve the creation of new data (e.g., adding a new data record to a database), an update to existing data (e.g., modifying a value of an existing data record in a database), a deletion of existing data (e.g., deleting an existing data record from a database), or some combination thereof. For example, a technician management system may consist of a system application 135 executing on an application server 140 that provides a user interface for access to a database 112 managed by a database server 110. The technician management system may be used to manage the schedule, expertise, and other aspects of technicians. Users may update the schedule of a technician to reflect current or future availability, assign a technician to a particular unit or region, update the expertise of a technician to reflect recent training, and the like.

At [2], the database server 110 stores the modified data in a first database 112—also referred to herein as a source database—and notifies the user device 102 that the modification operation is complete at [3]. Returning to the example above, the data regarding a technician's schedule, expertise, assignments, or the like may be updated in the database 112. Illustratively, data records may be added, updated, and/or deleted to bring the database 112 into a state that reflects the requested modification. Once the database 112 has been successfully updated, a notification may be provided to the user device 102. The notification may indicate successful storage of updated data to the database 112. The user device 102 may display the notification or information derived therefrom. In some cases, the user interface of the user device 102 (or the user interface of the technician management system as displayed on the user device 102) may be locked after submitting the data modification request or otherwise configured to indicate that the data modification request is pending. Upon receipt of the notification, the user interface may be unlocked or otherwise updated to indicate that the modification request was successful.

At [4], the user device 102 may continue to process additional data interactions, including additional data modification requests. These data interactions may be handled by the user device 102, application server 140, and database server 110 even if propagation of the data modification to other databases of the database management system 130 has not yet completed.

Once the data modification is complete in the source database 112, at [5], the event generator 122 determines that a new database event has occurred. The event generator 122 may be associated with the database server 110, or source database 112 in particular, and may monitor or otherwise be triggered if a database event occurs. The event generator 122 may then cause the event propagator 118 to generate an event notification regarding the database event. For example, the event generator 122 may determine that a database event has occurred that has affected a particular data entity (e.g., one or more technician database records have been updated). The event generator may communicate the database event to one or more event propagators 118, which may publish one or more notifications regarding the database event. The communication from an event generator 122 to an event propagator 118 may be or include an API call (e.g., with parameters regarding the database event, such as data entity identifiers, values, etc.), a message (e.g., a notification with data regarding the database event, such as data entity identifiers, values, etc.), or the like.

Figure 4:
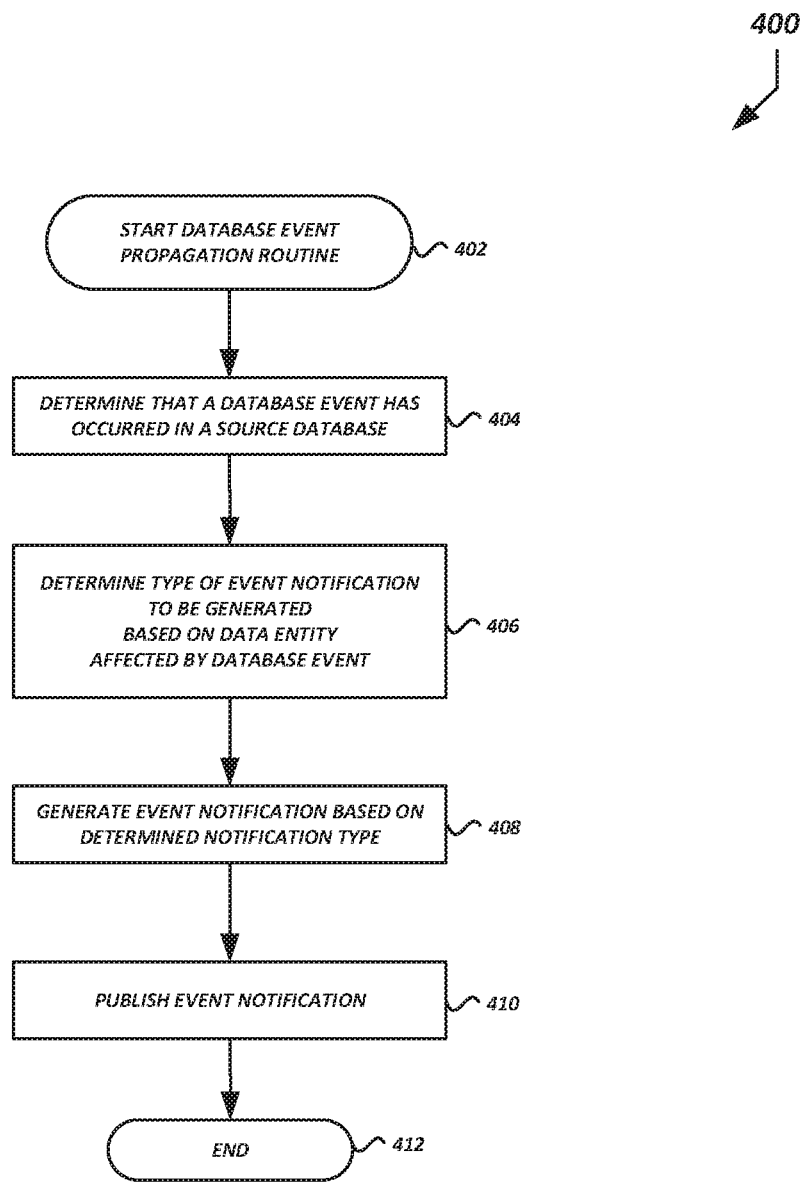
FIG. 4 is a flow diagram of an illustrative process for propagating a database event in a database management system according to some embodiments.

Upon being called in response to—or otherwise being notified of—the database event, the event propagator 118 generates an event notification 210 at [6]. An example process 400 that may be performed by the event propagator 118 to determine that a database event has occurred and generate and publish an event notification based thereon is shown in FIG. 4 and discussed in greater detail below.

At [7], event queues associated with one or more event consumers may obtain the published event notification 210. In some embodiments, event queues may poll the event propagator 118 or some other source for notifications, and the notifications can be placed into the queues for corresponding event consumers. For example, event queues 200 and 202, corresponding to event consumers 120 and 156 respectively, may obtain the event notification 210 generated at [6]. The event notification 210 may contain data identifiers indicating the type of database event that has occurred, the data entity that has been modified, the data records that have changed in the source database, other information, or some combination thereof. In some embodiments, there may be multiple different publication channels corresponding to multiple event types. Each publication channel may correspond to a different physical or logical event queue. Event consumers 120 may subscribe to event notifications for events of one or more event types, and may therefore be provided with event notifications that are published to the corresponding event queues or other publication channels.

At [8], the event consumer 120 can obtain the event notification. In some embodiments, the event consumer 120 may receive the event notification from the event queue 200. In the technician management system example, the event consumer 120 may subscribe to event notifications of a particular type, such as updates to a technician schedule entity (e.g., scheduling update made to a technician schedule table or other portion of the database 112), but the event consumer 120 may not subscribe to event notifications regarding updates of another entity, such as a technician expertise entity (e.g., the addition of a new area of expertise for a technician in the technician expertise table or other portion of the database 112). In this example, there may be two different event queues: one event queue 200 for event notifications regarding technician schedule entities, and another queue (not shown) for event notifications regarding technician expertise entities. By subscribing to only the type of event notifications regarding technician schedule entities, the event consumer 120 may receive event notifications from that queue 200, but not from the queue for event notifications regarding technician expertise entities.

Figure 5:
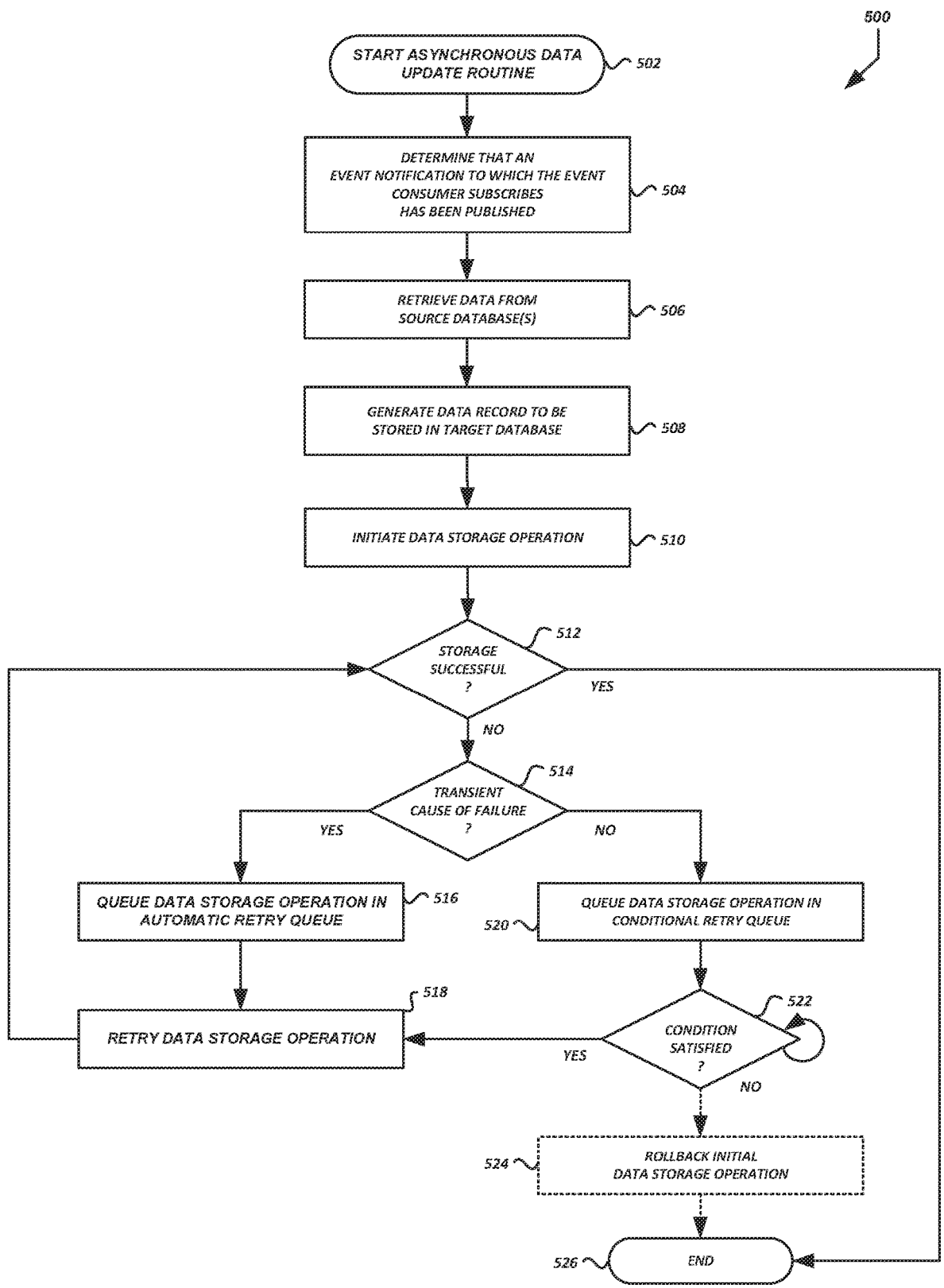
FIG. 5 is a flow diagram of an illustrative for applying asynchronous data updates, including a failure handling mechanism according to some embodiments.

The event consumer 120 (and, in some cases, additional event consumers such as event consumer 156) can process the event notification 210 at [9] to determine whether a second database—also referred to as a target database—is to be updated based on the notification. If a target database 114 is to be updated, at [10] the event consumer 120 can obtain the relevant data for the update operation to be performed on the target database. The data may be obtained from the source database 112 and/or other databases (e.g., database 116) that may have data that is to be used to update the target database 114 with a corresponding data modification. At [11] the event consumer 120 can initiate a corresponding modification in the target database 114. An example process 500 that may be performed by the event consumer 120 to receive an event notification, determine what data to update, and initiate an update to a target database based on the event notification is shown in FIG. 5 and discussed in greater detail below.

Figure 3:
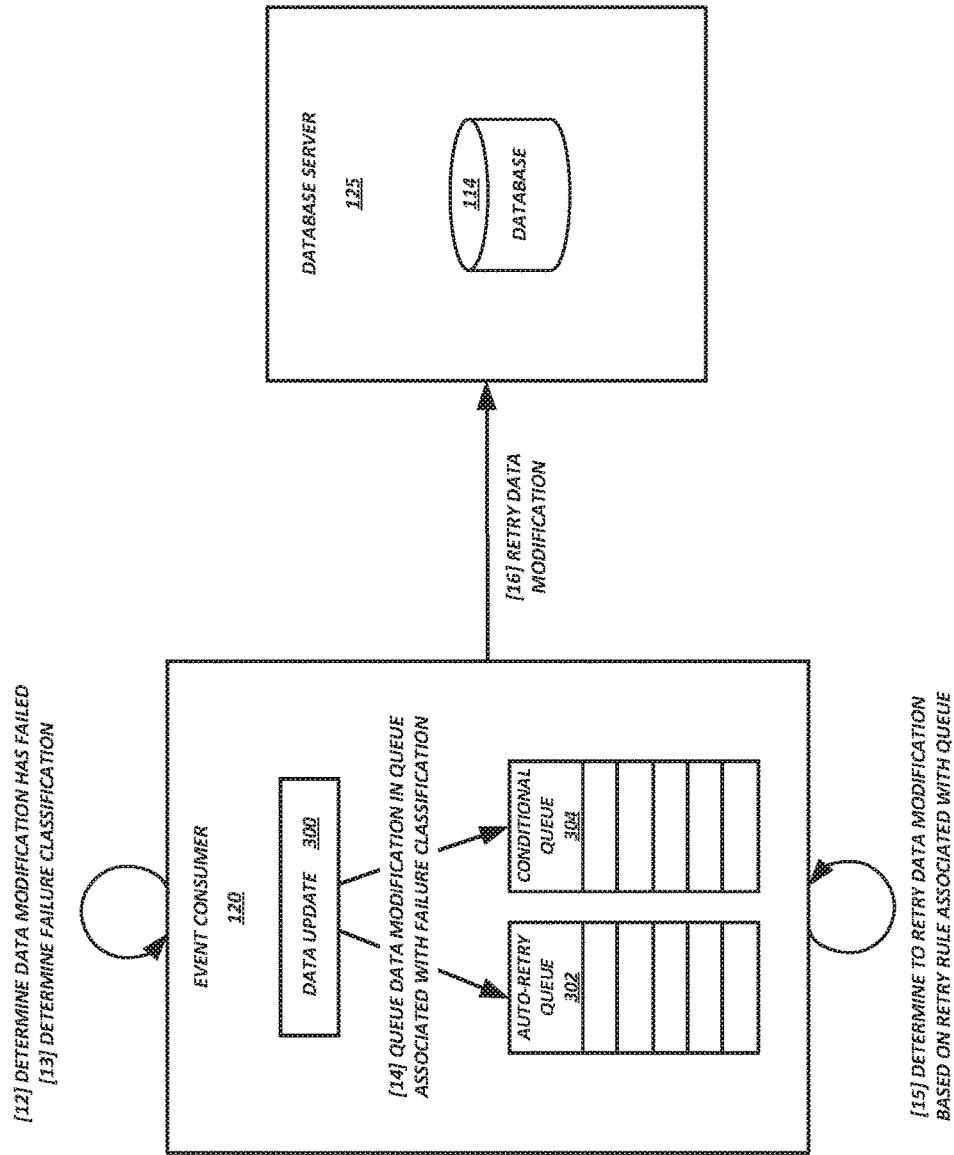
FIG. 3 is a block diagram of illustrative data flows and interactions during a failure and retry of an asynchronous data update according to some embodiments.

Continuing with FIG. 3, data flows and interactions are shown occurring between an event consumer 120 and a database server 125 to address a failure of a corresponding modification to a target database, such as the corresponding modification attempted at [11] in FIG. 2. At [12], the event consumer 120 may determine that the data modification event initiated in the target database 114 was not successfully completed. A failure may occur for any number of reasons, such as high network congestion, an outage of the database server 125 or an intermediary network component, a software bug, or the like. These examples are illustrative only; not all potential failure causes are specifically enumerated herein.

At [13], once a failure occurred in an attempted data update 300, the event consumer 120 (or some other module or component of the database management system 130) can determine the failure type. Failures may be classified into any number of different classifications. For example, a classification scheme may be implemented in which failures are classified as either transient (e.g., a failure caused by a momentary or temporary condition that may resolve on its own) or permanent (e.g., a failure caused by a design or implementation feature that will not likely resolve on its own). These different classifications may be treated differently due to their respective likelihoods of resolving on their own, the requirement of intervening corrective action, and the like. A transient failure that is caused by excessive network traffic that resulted in a connection timeout may resolve on its own without any specific action being taken. Instead, merely waiting for a period of time and retrying the data modification operation may be successful. In contrast, a permanent failure may have a structural cause, such as a software bug, and automatically retrying the operation after the passage of time will likely result in another failure unless a specific action is taken to address the cause. Classification of the failure may therefore impact the determination of which action to take next. For example, if a failure is permanent, then retrying the operation repeatedly may cause additional issues, such as contribute to network congestion and result in a "retry storm." Thus, the event consumer 120 may classify the failure to determine which action is to be taken next.

At [14], the event consumer 120 can store the failed data update 300 into a queue associated with the failure classification. A transient failure classification may result in the data modification operation being queued in a corresponding retry queue, such as an auto-retry queue 302, while a permanent failure classification may result in the data modification operation being queued in a different retry queue, such as a conditional retry queue 304. Different retry queues may be associated with different retry rules that govern when data modifications in the retry queues are to be retried. Although examples described herein use retry queues as the data structure and mechanism by which failed data operations are stored and handled, the examples are illustrative only and are not intended to be limiting. In some embodiments, other data structures may be used that do not imply a first-in-first-out sequence to retry operations.

At [15], based on the failure type and established retry rule, the event consumer 120 can determine whether and when to re-attempt the data modification operation in the target database. In some embodiments, data modification operations that have experienced transient failures are placed in an auto-retry queue 302 that is associated with an auto retry rule.

For example, data modification operations in the auto-retry queue 302 may be retried in the order in which they are placed into the queue, after some predetermined or dynamically determined period of time has expired (e.g., 15 minutes, 1 hour, 12 hours, 1 day, etc.), or the like. In some cases, if a data modification operation experiences another failure, the retry rule may specify a different period of time (e.g., exponential back-off), a different sequence for retrying the data modification, and/or a maximum number of retries before the data modification failure is re-categorized as permanent.

For data modifications that have experienced a permanent failure and have been placed in the conditional retry queue 304, the associated retry rule may specify that the data modification operation is not to be retried until the occurrence of a condition. For example, the data modification operation may not be retried until a software bug is fixed, a computing device is powered back on, a manual retry is requested, or the like. In some embodiments, the retry rule for the conditional retry queue 304 may also specify a predetermined or dynamically determined period of time after occurrence of the required condition before the data update 300 is to be retired (e.g., 15 minutes, 1 hour, 12 hours, 1 day, etc.). In some cases, if a data modification operation experiences another failure, the retry rule may specify a different period of time (e.g., exponential back-off), a different sequence for retrying the data modification, and/or a maximum number of retries before the data modification failure is re-categorized into another category, such as an unresolvable category of failures.

At [16], the event consumer 120 can retry the failed data modification according to the retry rule associated with the queue 302 or 304 into which the data modification was placed. An example process 500 that may be performed by the event consumer 120 to identify a failure and implement an appropriate retry policy to remedy the failure is shown in FIG. 5 and discussed in greater detail below.

Example Database Event Propagation Routine

FIG. 4 is a flow diagram of an illustrative process 400 for propagating a database event in a database management system 130.

The process 400 begins at block 402. The process 400 may begin in response to an event, such as when a database modification occurs in a first database or when an event propagator 118 begins operation. When the process 400 is initiated, a set of executable program instructions stored on one or more non-transitory computer-readable media (e.g., hard drive, flash memory, removable media, etc.) may be loaded into memory (e.g., random access memory or "RAM") of a computing device. For example, the event propagator instructions 612 shown in FIG. 6 may be loaded into memory 608 of the event propagator 118 and executed by one or more processors 600. In some embodiments, the process 400 or portions thereof may be implemented on multiple processors, serially or in parallel.

At block 404, the event propagator 118 can determine that a database event has occurred in a source database. The event propagator 118 may determine that the database event has occurred by receiving a notification via an event generator 122, receiving application programming interface (API) call from the event generator 122 or database server 110, or the like. For example, the event generator 122 may be invoked by the source database's database server 110 as part of—or subsequent to—the process of updating the source database 112. In the technician management system example described above with respect to FIG. 2, the database server 110 may call the event generator 122 directly, or generate a notification that is received by the event generator 122, in response to the database server 110 modifying data in the database 112 to reflect a requested change to technician data. The event generator 122 may determine that data regarding a particular technician (e.g., the technician's schedule or expertise) has been changed in database 112 based on parameters received as part of the API call, data in the notification, or the like. The parameters or notification data may include identifiers of the data records being changed, data regarding the changes being made, or copies of the original data and/or changed data. By analyzing the information in the parameters or notification, the event generator 122 can determine that a database event has occurred, and then communicate information regarding the database event to the event propagator 118.

Although the example discussed herein refers to the event generator 122 being provided with a notification or called via an API request, the example is illustrative only and is not intended to be limiting. In some embodiments, the event generator 122 may be notified of or otherwise determine that a database event occurred via other means. For example, the event generator 122 may monitor a log file associated with the target database 112, and determine that a database event has occurred based on log file data regarding the database update.

At block 406, the event propagator 118 determines the type of event notification to be generated based on the data entity affected by the database event. In some embodiments, a particular database event in the target database may involve modifications to multiple data entities. Generally described, a data entity may refer to a particular classification, type or collection of closely-related data. For example, schedule data representing the time of day that a technician is available or the day of the week that the technician is available may be considered to be a data entity. Expertise data representing the different areas in which a technician has expertise may be a different entity. The data entities may correspond to structures in the target database, such as tables, columns, or groupings of data objects. In some embodiments, the data entities may be logical constructs that reference individual pieces of data that may or may not be stored in the same structure in the target database.

The event propagator 118 may generate a different type of notification for different data entities that have experienced a data modification, rather than generating a notification for a single data modification transaction that may implicate multiple entities. A transaction that includes data modifications to multiple data entities may be handled as multiple separate database events causing multiple separate event notifications in order to avoid providing event notifications that are needlessly complex. Because the actions to update individual data entities can be performed independently, generating separate event notifications for each entity provides flexibility to support event consumers that subscribe to only a subset of them, and does not require the event consumers to receive all of the data for all of the entities affected by a complex transaction.

For example, a single transaction may include updating a technician's schedule, expertise, and assigned location. Although the change may be submitted to the target database and processed as a single transaction, the change may affect multiple data entities: the technician schedule entity (e.g., a schedule table or other portion of the target database), the technician expertise entity (e.g., an expertise table or portion of the target database), and the technician location entity (e.g., a location table or portion of the target database). The single transaction may give rise to multiple different types of event notifications, corresponding to the multiple database entities that have been modified or otherwise implicated by the transaction.

At block 408, the event propagator 118 can generate an event notification for event consumers to be notified of the database event. That data from which the event propagator 118 generates the event notification may be included in the notification/parameters/etc. that the event propagator obtained when determining that a database event has occurred. In some embodiments, the event propagator 118 may obtain additional data to augment the received data, such as additional data form the source database.

The structure, formatting, and content of the event notification may be based on the determined event notification type. One type of event notification may include certain data fields for event consumers 120 to determine which data has been modified and how to propagate the modification to another database, while a different type of event notification may include a different number of data fields and/or data fields with different values or formatting so that event consumers 120 can determine how to propagate a different type of data modification. For example, an event notification for a database event such as changing a technician schedule may include a field for a technician's unique identifier, and a field indicating the database event included a change to the technician schedule entity. As another example, an event notification for a database event such as adding a new technician to a particular merchant may include a field for the merchant's unique identifier, a field for the technician's unique identifier, and a field indicating the database event included addition of a new technician to the technician entity.

At block 410, the event propagator may publish the event notification. For example, the event propagator 118 may make the event notification available to event queues, such as to event queue 200.

The process 400 may terminate at block 412. In some embodiments, portions of the process 400 may be repeated, such as for transactions that involve multiple different data entities and for which multiple event notifications are to be generated. In such cases, the process 400 may return to block 406, for example, to generate additional event notifications as needed. In some embodiments, the different notifications (or subsets thereof) may be generated in parallel rather than serially.

Example Database Update and Failure Handling Routine

FIG. 5 is a flow diagram of illustrative process 500 for executing a data modification operation and handling a failure that arises during the operation.

The process 500 begins at block 502. The process 500 may begin in response to an event, such as when an event notification is published by the event propagator 118 or when the event consumer 120 begins operation. When the process 500 is initiated, a set of executable program instructions stored on one or more non-transitory computer-readable media (e.g., hard drive, flash memory, removable media, etc.) may be loaded into memory (e.g., random access memory or "RAM") of a computing device. For example, the data modification instructions 632 shown in FIG. 6 may be loaded into memory 630 of the event consumer 120 and executed by one or more processors 620. In some embodiments, the process 500 or portions thereof may be implemented on multiple processors, serially or in parallel.

At block 504, the event consumer 120 may determine that an event notification to which the event consumer subscribes has been published. The event consumer 120 may be sent the event notification by an event queue 200, or the event consumer 120 may obtain the event notification by, e.g., monitoring or polling the event queue 200. In some embodiments, the event consumer 120 obtains the event notification by virtue of subscribing to event notifications of a certain type, such as those affecting a certain data entity. For example, the event consumer 120 may include or otherwise be associated with an event queue 200 that obtains notifications regarding particular types of events and provides those notifications to the event consumer 120.

At block 506, the event consumer 120 can process the event notification and retrieve data from the source database 112 that is to be used when propagating the database event represented by the event notification to a target database 114. By obtaining data from the source database 112 in response to receiving the event notification, rather than obtaining data from the event notification itself, the event consumer 120 can ensure that it obtains the most up-to-date data regarding the database event. This can be particularly advantageous when dealing with time-dependent data, such as temporal inventory data (e.g., technician's schedules and availably that change day-to-day or hour-to-hour).

Because propagation of the database event represented by the event notification happens asynchronously, the event notification may be received and acted upon by the event consumer after another change has occurred to the data entity. For example, a technician may update his schedule, and then decide to update his schedule yet again before the original update has been propagated to target databases. When an event consumer receives the original event notification, the event consumer may obtain up-to-date data that reflects the second schedule update and proceed to propagate the current, up-to-date schedule data without propagating the now out-of-date original update. If a subsequent event notification is later received by the event consumer 120, the event consumer may merely propagate the same up-to-date data, thereby not adversely affecting the target database. Alternatively, the event consumer 120 may determine that the target database already reflects the up-to-date data from the source database, and not re-propagate the change.

In some embodiments, asynchronous messaging may result in messages being received by an event consumer 120 out of order. Returning to the example above, the event notification regarding the second update operation may be received by the event consumer 120 before the event notification regarding the first update operation. This may occur due to networking issues, latencies in a distributed computing environment with multiple event propagators 118, or the like. By obtaining data from the source database 112 in response to receiving the event notification, rather than obtaining data from the event notification itself, the event consumer 120 can ensure that it obtains the most up-to-date data regarding the database event even if event notifications regarding different changes to the same data entity are received out of order.

At block 508, the event consumer 120 can generate a data record or other data update operation to be applied to the target database. The data record may include data obtained from the source database, as described above. In some embodiments, the generated data record may be a combination of data from the source database with other data. For example, the event consumer 120 may obtain data from other databases of the database management system, other data sources external to the database management system 130, or generate data based on additional processing. This additional data may augment or replace data from the source database when updating a target database.

At block 510, the event consumer 120 can initiate the generated data update operation to propagate the database event to the target database.

At decision block 512, the event consumer 120 can determine whether the initiated data update operation is successful. The determination may be based on a failure notification triggered at the end of the operation or by some pre-established criterion. For example, if the database operation times out, a particular failure notification (e.g., error message, exception, etc.) may be generated and returned to the event consumer 120. If the event consumer 120 determines that the storage update operation did not process as expected, the system may analyze the failure notification to determine the failure classification type.

At decision block 514, the event consumer 120 can determine a course of action to take based on the determined failure classification. In some embodiments, when failures may be classified as transitory or permanent, the event consumer 120 may determine whether the failure is transient. If so, the process may proceed to block 516 where the data storage operation is queued in retry queue with a retry policy designed for transitory failures (e.g., auto-retry, exponential back off, etc.). When the data storage operation is to be retried, the process 500 may proceed to block 518.

Otherwise, if the data storage operation is not transient, the process 500 may proceed to block 520 where the data storage operation is queued in retry queue with a retry policy designed for permanent failures. For example, the queue may be a conditional retry queue in which the data storage operation is retried only in response to occurrence of a condition, such as powering on a database server, correcting a bug, etc. At decision block 522, the event consumer 120 can determine whether the condition specified by the conditional retry queue rule been satisfied. If so, the process may proceed to block 518 where the data storage operation is retried. Otherwise, if the retry condition is not satisfied, the process 500 may proceed to block 524 wherein the initial data storage operation (e.g., to the source database, as shown in FIG. 2) is rolled back because the data storage operation has not been successfully propagated to the target database. In some embodiments, the rollback may be triggered in response to a condition, such as after a threshold period of time or after a threshold number of retries have failed. In some embodiments, the data storage operation may remain in the conditional retry queue until removed, e.g., by a system administrator.

The process 500 may terminate at block 526.

Example Computing System Components

Figure 6:
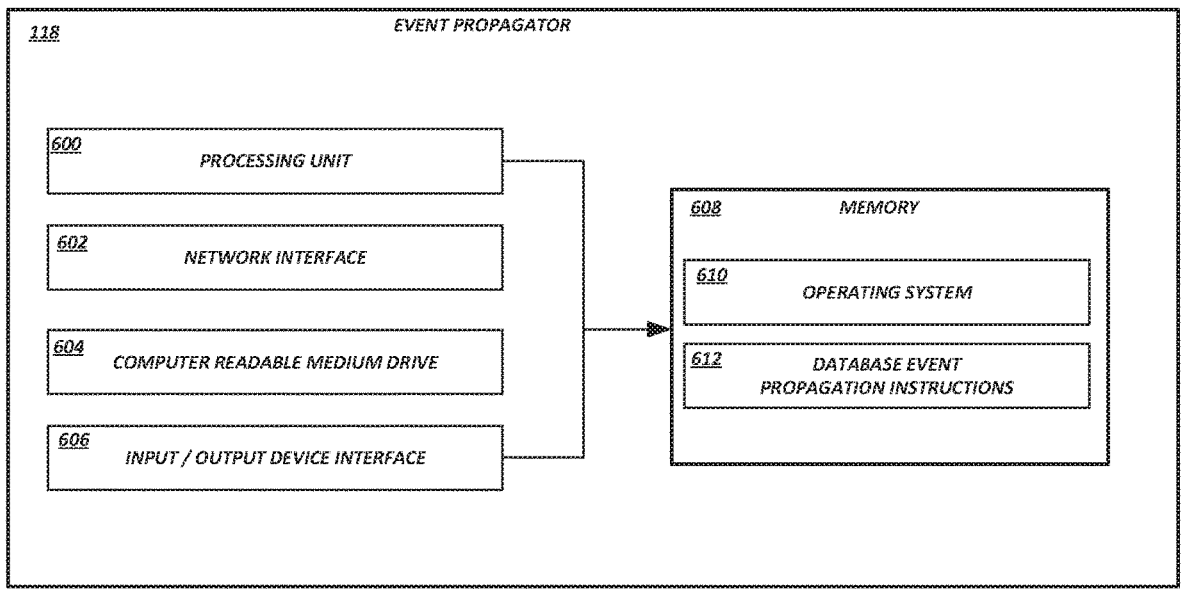
FIG. 6 shows an illustrative event propagator and an event consumer of a database management system according to some embodiments.
Figure 6:
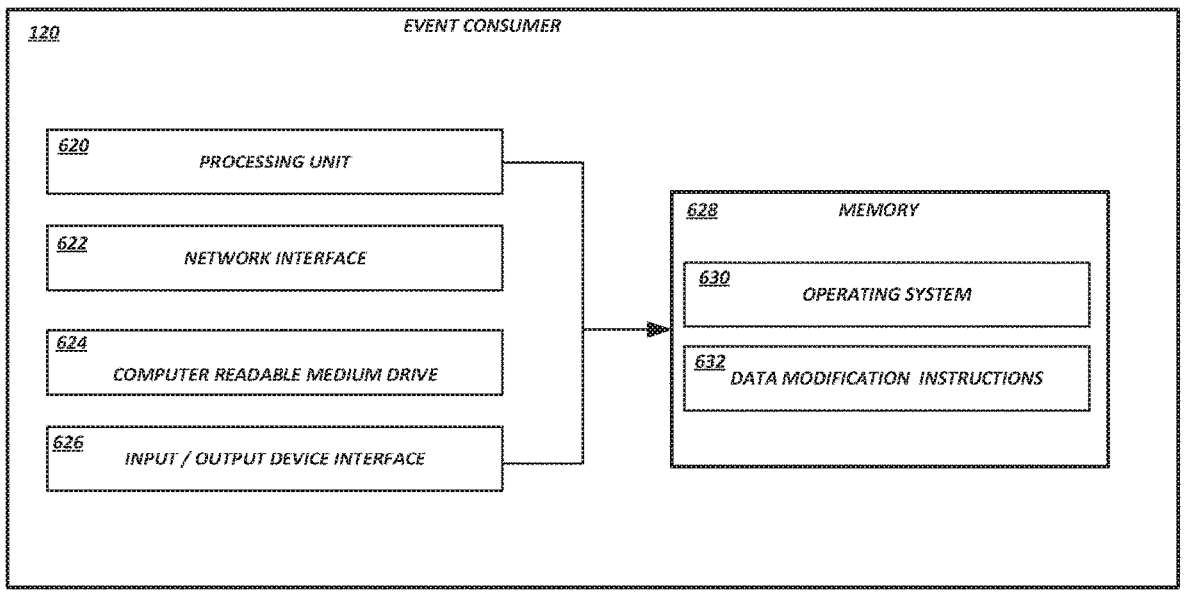

FIG. 6 shows components of an illustrative event propagator 118 and event consumer 120 implemented as individual computing devices.

In some embodiments, as shown, the event propagator 118 may include: one or more computer processors 600, such as physical central processing units ("CPUs"); one or more network interfaces 602, such as a network interface cards ("NICs"); one or more computer readable medium drives 604, such as a high density disk ("HDDs"), solid state drives ("SDDs"), flash drives, and/or other persistent non-transitory computer-readable media; one or more input/output device interfaces 606, and one or more computer readable memories 608, such as random access memory ("RAM") and/or other volatile non-transitory computer-readable media. The computer readable memory 608 may include computer program instructions that the computer processor 600 executes in order to implement one or more embodiments. For example, the computer readable memory 608 can store an operating system 610 that provides computer program instructions for use by the computer processor 600 in the general administration and operation of the event propagator 118. The computer readable memory 608 may also include database event propagation instructions 612 for implementing features of the event propagator 118, such as performing the process 400 shown in FIG. 4.

In some embodiments, as shown, an event consumer 120 may include: one or more computer processors 620, one or more network interfaces 622, one or more computer readable medium drives 624, one or more input/output device interfaces 626, and one or more computer readable memories 628. The computer readable memory 628 may include computer program instructions that the computer processor 620 executes in order to implement one or more embodiments. For example, the computer readable memory 628 can store an operating system 630 that provides computer program instructions for use by the computer processor 620 in the general administration and operation of the event consumer 120. The computer readable memory 628 may also include data update instructions 632 for implementing features of the event consumer 120, such as performing the process 500 shown in FIG. 5.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing asynchronous propagation of database events, wherein the system comprises:
   an event generator comprising one or more computing devices, wherein the event generator is configured to at least:
      determine, based at least partly on monitoring for database storage operations occurring at a first database server, that a first database storage operation has been performed, wherein the first database storage operation modifies data associated with a first data entity and data associated with a second data entity;
   an event propagator comprising one or more computing devices, wherein the event propagator is configured to at least:
      identify a first event type and a second event type, of a plurality of event types, based at least partly on the first data entity and the second data entity;
      generate a first event notification associated with the first event type, wherein the first event notification identifies the first data entity;
      generate a second event notification associated with the second event type, wherein the second event notification identifies the second data entity; and
      publish the first event notification and the second event notification, wherein a plurality of event consumers are configured to subscribe to published event notifications; and
   an event consumer, of the plurality of event consumers, comprising one or more computing devices, wherein the event consumer is configured to at least:
      obtain the first event notification based at least partly on a subscription of the event consumer to event notifications associated with the first event type, wherein the second notification is not received by the event consumer, and wherein the event consumer does not subscribe to event notifications associated with the second event type;

retrieve update data from the first database server regarding a modification to the data associated with the first data entity;

initiate a second database storage operation with a second database server based at least partly on the update data;

determine that the second database storage operation has experienced a failure associated with a first failure type of a plurality of failure types;

queue the second database storage operation in a first queue of a plurality of queues, wherein the first queue is associated with the first failure type; and initiate an update retry operation using the second database storage operation based at least partly on a retry rule associated with the first queue.

2. The system of claim 1, further comprising an application server comprising one or more computing devices, wherein the application server is configured to at least:

generate a user interface through which time-dependent database data is updated, wherein the first database storage operation comprises a modification to a time-dependent data record entered via the user interface; and cause display by the user interface of an indication of successful completion of the first database storage operation prior to the event consumer initiating the second database storage operation.

3. The system of claim 1, wherein the first failure type comprises one of a transient failure type or a permanent failure type.

4. The system of claim 1, wherein the event consumer is further configured to at least augment the update data with second update data retrieved from a third database server based at least partly on the first event notification.

5. A computer-implemented method comprising:

under control of a computing system comprising one or more computing devices configured to execute specific instructions, determining, by an event propagation system, that a first data storage operation has occurred in a first database, wherein the first data storage operation relates to a first data entity;

generating, by the event propagation system, a notification regarding the first data storage operation, wherein the notification is associated with the first data entity;

receiving, by an event consumption system, the notification based at least partly on a subscription to notifications associated with the first data entity;

obtaining, by the event consumption system, data associated with the first data entity, wherein the data associated with the first data entity is obtained from the first database based at least partly on the notification; and initiating, by the event consumption system, a second data storage operation in a second database based at least partly on the data associated with the first data entity.

6. The computer-implemented method of claim 5, further comprising:

determining, by the event propagation system, an event notification type based at least partly on the first data storage operation relating to the first data entity; and determining, by the event propagation system, one or more data fields to include in the notification based at least partly on the event notification type, wherein generating the notification comprises including the one or more data fields in the notification.

7. The computer-implemented method of claim 5, further comprising:

determining, by the event consumption system, that the second data storage operation has experienced a failure associated with a failure classification; and queuing, by the event consumption system, the second data storage operation in a first queue of a plurality of queues based at least partly on the failure classification, wherein the first queue is associated with a retry rule.

8. The computer-implemented method of claim 7, further comprising:

receiving a failure notification regarding the failure; and
determining the failure classification based at least partly on the failure notification.

9. The computer-implemented method of claim 8, wherein determining the failure classification comprises determining one of: a transient failure classification or a permanent failure classification.

10. The computer-implemented method of claim 7, further comprising:

determining to retry the second data storage operation based at least partly on the retry rule; and
retrying the second data storage operation.

11. The computer-implemented method of claim 10, further comprising determining, by the event consumption system, that a condition specified by the retry rule has been satisfied.

12. The computer-implemented method of claim 10, further comprising determining that a period of time specified by the retry rule has expired.

13. The computer-implemented method of claim 5, further comprising:

determining, by the event propagation system, that the first data storage operation relates to a second data entity;

generating, by the event propagation system, a second notification regarding the first data storage operation, wherein the second notification is associated with the second data entity, and wherein the event consumption system does not subscribe to notifications associated with the second entity; and receiving, by a second event consumption system, the second notification based at least partly on a subscription of the second event consumption system to notifications associated with the second data entity.

14. A system comprising:

an event propagator comprising one or more computing devices configured to at least:

determine that a first data storage operation has occurred in a first database, wherein the first data storage operation relates to a first data entity; and generate a notification regarding the first data storage operation, wherein the notification is associated with the first data entity; and an event consumer comprising one or more computing devices configured to at least:

receive the notification based at least partly on a subscription to notifications associated with the first data entity;

obtain data associated with the first data entity from the first database based at least partly on the notification; and initiate a second data storage operation in a second database based at least partly on the data associated with the first data entity.

15. The system of claim 14, wherein the event propagator is further configured to at least:
   determine an event notification type based at least partly on the first data storage operation relating to the first data entity;
   determine one or more data fields to include in the notification based at least partly on the event notification type, wherein the notification is generated to include the one or more data fields in the notification.

16. The system of claim 14, wherein the event consumer is further configured to at least:
   determine that the second data storage operation has experienced a failure associated with a failure classification; and
   retry the second data storage operation based at least partly on a retry rule, wherein the retry rule is associated with the failure classification.

17. The system of claim 16, wherein the event consumer is further configured to at least:
   receive a failure notification regarding the failure; and
   determine the failure classification based at least partly on the failure notification.

18. The system of claim 16, wherein the event consumer is further configured to at least:
   determine to retry the second data storage operation based at least partly on the retry rule; and
   retry the second data storage operation.

19. The system of claim 18, wherein the event consumer is further configured to determine that a condition specified by the retry rule has been satisfied.

20. The system of claim 14, further comprising a second event consumer comprising one or more computing devices,
   wherein the event propagator is further configured to at least:
      determine that the first data storage operation relates to a second data entity; and
      generate a second notification regarding the first data storage operation, wherein the second notification is associated with the second data entity, and wherein the event consumption system does not subscribe to notifications associated with the second entity; and
   wherein the second event consumer is further configured to at least:
      receive the second notification based at least partly on a subscription of the second event consumption system to notifications associated with the second data entity.

\* \* \* \* \*